United States Patent [19]

Hahn et al.

[11] 4,443,397
[45] Apr. 17, 1984

[54] MULTIPLE-LAYERED SHEETING APPARATUS AND PROCESS THEREFOR

[75] Inventors: Granville J. Hahn; Raleigh N. Rutledge, both of Big Spring, Tex.

[73] Assignee: Cosden Technology, Inc., Dallas, Tex.

[21] Appl. No.: 408,105

[22] Filed: Aug. 16, 1982

[51] Int. Cl.³ ............................................. B29F 3/04
[52] U.S. Cl. ................................ 264/171; 264/40.7; 425/131.1; 425/133.5; 425/146; 425/462
[58] Field of Search ............... 264/171, 173, 40.7; 425/131.1, 133.5, , 133.1, 145, 146, 462

[56] References Cited

U.S. PATENT DOCUMENTS

| | | | |
|---|---|---|---|
| 3,694,119 | 9/1972 | Scheibling | 264/171 |
| 3,743,459 | 7/1973 | Schrenk et al. | 425/133.5 |
| 3,770,357 | 11/1973 | Gibney | 425/131.1 |
| 3,833,704 | 9/1974 | Nissel | 264/171 |
| 3,860,036 | 1/1975 | Newman, Jr. | 425/131.1 |
| 3,860,372 | 1/1975 | Newman, Jr. | 425/133.1 |
| 3,918,865 | 11/1975 | Nissel | 425/131.1 |
| 3,924,990 | 12/1975 | Schrenk | 425/131.1 |
| 4,094,947 | 6/1978 | Alfrey, Jr. et al. | 425/131.1 |
| 4,144,011 | 3/1979 | Sponaugle | 425/133.5 |
| 4,249,875 | 2/1981 | Hart et al. | 425/133.1 |

FOREIGN PATENT DOCUMENTS

| | | | |
|---|---|---|---|
| 3010691 | 9/1981 | Fed. Rep. of Germany | 264/171 |
| 2343582 | 11/1977 | France | 425/131.1 |
| 2437289 | 5/1980 | France | 425/133.5 |
| 55-28887 | 2/1980 | Japan | 264/171 |
| 57-13420 | 3/1982 | Japan | 264/171 |

*Primary Examiner*—Jeffery R. Thurlow
*Attorney, Agent, or Firm*—Schwartz, Jeffery, Schwaab, Mack, Blumenthal & Koch

[57] ABSTRACT

Disclosed is an apparatus and process for the production of multiple-layer film or sheeting having desirable surface characteristics, especially including uniformity of layer thickness and width. The apparatus includes a feedblock which selectively splits the coextruded streams, controls the flow thereof and applies the layers in a manner such that the thickness of the various layers can be more easily and accurately controlled across the width of the sheeting.

17 Claims, 6 Drawing Figures

MULTIPLE-LAYERED SHEETING APPARATUS AND PROCESS THEREFOR

BACKGROUND OF THE INVENTION

The present invention relates to the production of multiple-layer film or sheeting, and more especially, to a process and apparatus for extrusion of multiple-layered sheeting having a layer or layers of polymeric material having desirable surface characteristics. More especially, the present invention describes the co-extrusion of multiple-layered sheeting, with each layer exhibiting uniform layer thickness across the width thereof, by an apparatus which has an improved laydown means and which is easily adjustable to produce sheeting products having from two to five layers.

Co-extrusion processes for the production of multi-layered sheeting are, of course, well known in the art. However, prior processes do not quarantee, and and often do not produce, a co-extruded layer of uniform thickness on the main extruded material. This problem is especially acute when the co-extruded layer comprises a polymeric material having a comparatively low viscosity. Such a material tends to migrate from areas of higher extruder die pressure, to areas of lower extruder die pressure. This results in a sheeting product having varying layer thicknesses across the width of the sheet.

Furthermore, in known processes and apparatus, it was not readily possible to adjust the relative thickness of the various layers, in response to different processing characteristics and/or different requirements for the final products. Furthermore, it was not easy to vary the number of layers to be included in a particular product.

Thus, the present invention is concerned with an improved laydown means and process for use in the production of multiple-layered sheeting of materials, particularly those which have different processing characteristics, resulting in a uniformity of layer thickness across the entire width of the extruded sheeting.

The present invention is also directed to an improved laydown means for the application of multiple-layers of polymeric resinous material to an initial polymeric base layer, the different polymeric materials in most cases exhibiting different processing characteristics. The laydown device permits easy adjustment of overall layer thickness as well as adjustment of the number of layers.

SUMMARY OF THE INVENTION

It is therefore an object of the present invention to provide a co-extrusion apparatus for producing multiple-layered sheeting having an improved laydown means for applying a layer or layers of uniform thickness(es) across their width.

Another object of the present invention is to provide a co-extrusion apparatus for producing multiple-layered sheeting having a laydown means for applying a layer or layers of polymeric materials to a base polymer layer, the polymeric materials exhibiting different processing characteristics, resulting in sheeting comprising a layer or layers of uniform thickness(es) across their width.

Still another object of the present invention is the provision of an apparatus for producing multiple-layered sheeting having simple means for controlling the thickness of individual layers at any point across the entire width of the sheeting and for controlling the number of the layers of the sheeting.

A further object of the present invention is to provide a process for producing in a single extrusion step multiple-layered sheeting having uniform layer thickness across the width of the sheeting.

Another object of the present invention is to provide a process for simple control of the uniformity of individual layer thickness at any point along the width of the sheeting.

Still another object of the present invention is to provide a process for producing in a single extrusion step multiple-layered sheeting wherein the number and thickness of layers can be simply controlled.

Yet another object of the present invention is the provision of a process for producing a multiple-layered sheeting applicable to a wide variety of polymeric materials for use as both the extruded base layer and the co-extruded laydown resin.

Thus, in accomplishing the foregoing and other objectives, there is provided in accordance with one aspect of the present invention a co-extrusion apparatus for the production of multi-layered products of thermoplastic synthetic resins having selected numbers of layers, comprising a main extruder for producing a main heat-plasticized resin stream, at least one co-extruder for producing a side heat plastified resin stream, a co-extrusion feedblock positioned downstream of the extruder and the co-extruder for receiving the main resin stream and the side resin stream and for producing a combined resin stream, the co-extrusion block comprising at least one slotted plates having a central orifice which provides for the passage of the main resin stream and slotted portions on either side of the central orifice for laying down layers of the side resin stream upon the main resin stream, conduit means within the co-extrusion block for splitting the side resin stream and supplying sub-streams thereof to the slotted portions, and adjustment means for varying the volume of flow in each of the sub-streams, and a sheeting die downstream of the co-extrusion block for receiving the combined stream and for forming the multi-layered product into a multi-layered sheet.

In a preferred embodiment of the present invention, the co-extruder feedback means further comprises a main co-extruder body positioned between the main extruder and the sheeting die, the body comprising a central orifice aligned with the central orifice of the slotted die providing for the passage of the base layer therethrough.

In another aspect of the present invention, there is provided a process for producing a multi-layered sheeting, comprising the steps of extruding a base layer stream of a heat-plastified material, co-extruding at least one side stream of a heat-plastified material, passing the base layer stream through a co-extrusion feedblock, passing each side stream into a feedblock, splitting each side stream in the feedblock into a plurality of sub-streams, selectively passing at least one of the sub-streams to a selected plate member attached to the feedblock, the plate member having a slot for each sub-stream communicating with the base layer stream passing through the plate member, laying down at least one layer of the sub-stream upon the base layer stream at the plate member to produce a multi-layered stream, and passing the multi-layered stream through an extrusion die to form the multi-layered sheeting.

Other objects, features and advantages of the present invention will become apparent from the description which follows, when considered in view of the accompanying drawings.

DETAILED DESCRIPTION OF PREFERRED EMBODIMENTS

In accordance with the present invention, there have been provided an improved process and apparatus for producing a multiple-layered sheet or film having layers of uniform thickness across the entire sheeting or film. More particularly, the sheet of film may be produced from two or more polymeric materials exhibiting different processing characteristics, particularly melt viscosity. Specifically, the sheeting or film can comprise from one to four or more layers of co-extruded resinous material applied to a polymeric base layer. In each case, each of the individual co-extruded layers exhibits uniform thickness across its width. Thus, by the combination of these different layers, a product is obtained having improved characteristics, especially improved surface characteristics. Because of the uniform thickness, such a product will exhibit a consistency in the improved characteristic not previously possible. An example of a product which the present invention can provide is a plastic cup of the type presently used by the airlines. Such a cup would comprise a base layer of polystyrene and a co-extruded polyethyleneterephthalate (PET) surface layer. This is only one example of many products within the scope of the present invention.

Figure 1:
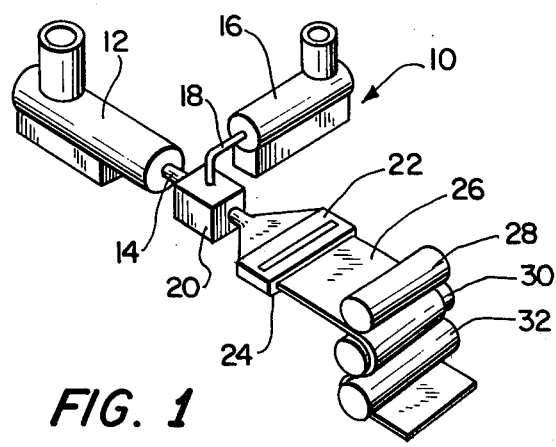
FIG. 1 schematically represents an apparatus for the preparation of a multiple-layered sheet or film employing the method of the present invention.

Referring now to the drawings, in FIG. 1 there is schematically illustrated an apparatus, generally designated by the reference numeral 10, particularly adapted to the process of the invention. The apparatus 10 comprises in cooperative combination a main extruder 12 for the extrusion of a first polymer resinous material, and connected thereto, a discharge conduit 14. A first co-extruder 16 having a discharge conduit 18 is adapted for providing a minor stream of heat plastified polymeric resin. Conduit 18 terminates at co-extrusion block 20 at a point upstream of the sheeting die 22 which is in operative communication with co-extrusion block 20 and receives the flow therefrom. Sheet 26 is formed at the die lips 24 and thereafter progresses from the die to polished cooling rollers 28, 30 and 32.

Figure 2:
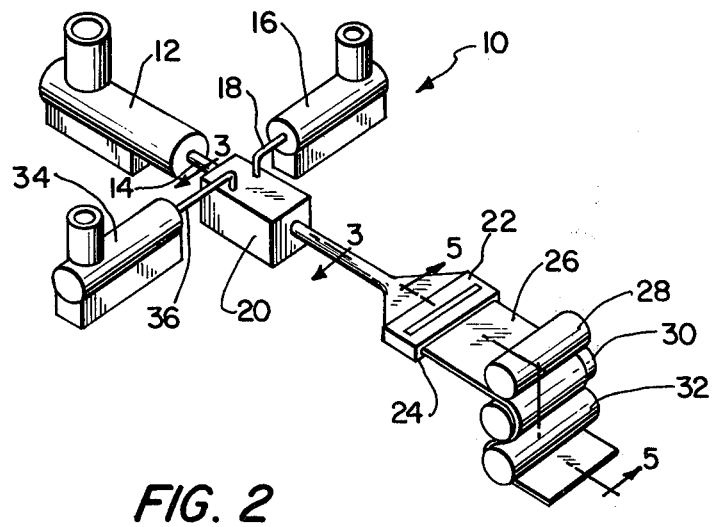
FIG. 2 is similar to FIG. 1, and represents an apparatus having two co-extruders for the preparation of a multiple-layered sheet or film.

In FIG. 2 there is schematically illustrated an apparatus similar to that of FIG. 1, except that in FIG. 2 there are shown two co-extruders as compared to the one co-extruder of FIG. 1. Therefore, in addition to the apparatus described in FIG. 1, the apparatus 10 further comprises a second co-extruder 34 having a discharge conduit 36 connected thereto. The discharge conduit 36 terminates in approximately the same area of the co-extrusion block 20 as discharge conduit 18.

Figure 3:
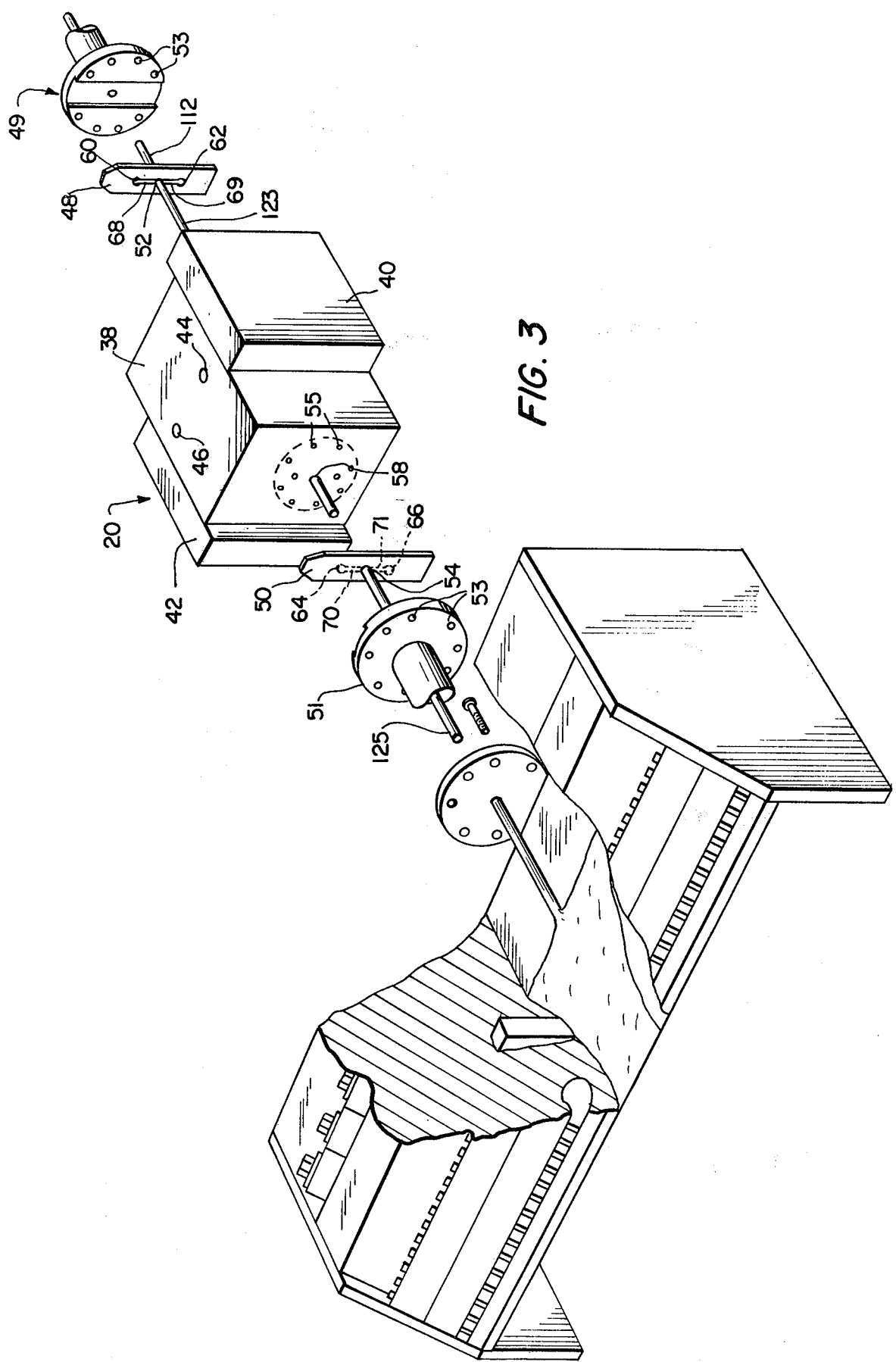
FIG. 3 is an internal, exploded perspective view of the co-extrusion block taken along the line 3—3 of FIG. 2.

In FIG. 3 there is illustrated an internal, exploded perspective view of co-extrusion block 20 taken along line 3—3 of FIG. 2. The block 20 comprises a main co-extrusion body 38 having adjacent thereto stream dividers 40, 42. Shown entering the top of the co-extrusion body 38 are passages 44 and 46 for polymeric resin streams. Slotted plates 48 and 50 are situated upstream and downstream of the main co-extrusion body, respectively. These plates are held in place by the slotted housing members 49 and 51, respectively. These housing members comprise a slot for receiving the slotted plates, and a series of bolt holes 53 for attachment to the main co-extrusion body. The slotted plates 48, 50 have orifices 52 and 54, respectively, providing passage of the main resin stream 112 therethrough. An orifice 58 is provided in the main co-extrusion body 38 to serve this same purpose. Each of the slotted plates 48, 50 is provided with a pair of cylindrical bores 60, 62 and 64, 66, respectively, which pass only part way through the plates. These bores are connected to the orifices 52, 54 by the slots 68, 69 and 70, 71, respectively, which likewise do not pass completely through the plates. Thus, the resin streams entering the slotted plates by the cylindrical bores 60, 62, 64, 66 can pass to the orifices 52, 54 where the co-extruded resins are applied to the base layer of polymeric resin.

Figure 4:
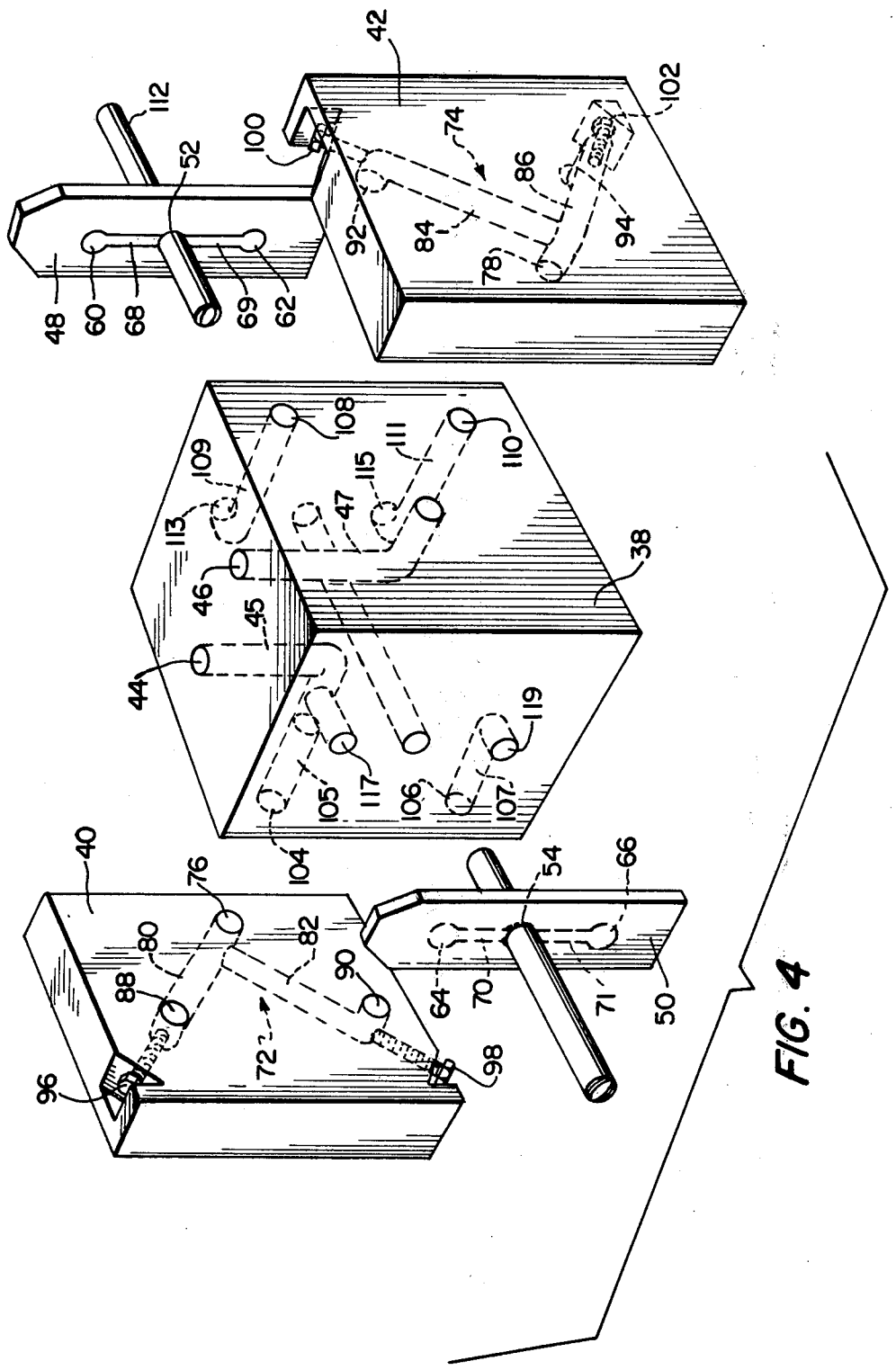
FIG. 4 is a more detailed exploded perspective view of the co-extrusion block of FIG. 3.

Referring now to FIG. 4, there is illustrated in more detail the flow of the various polymeric streams in the co-extrusion block. As in FIG. 3, the main co-extrusion body 38 is illustrated as having resin inlet passages 44, 46. Also as illustrated in FIG. 3, stream dividers 40, 42 are attached adjacent the main co-extruder body with the slotted plates 48, 50 situated on either side of the co-extrusion body 38 along the axis of travel of the polymeric base layer. The stream divider 40 and 42 have conduit means, generally indicated by 72 and 74, respectively, providing for the passage of the co-extruded resin streams therethrough. The conduit means have initial inlet portions 76 and 78, respectively, and each comprise two conduit paths 80, 82 and 84, 86, respectively, leading from the initial conduit portions through the stream dividers to outlet ports 88, 90 and 92, 94, respectively. Each of the stream dividers 40, 42 also comprise screws 96, 98 and 100, 102, respectively. The screws engage the interior of the respective conduit paths in order to adjust the flow of resin therethrough. The outlet ports 88, 90 and 92, 94 cooperate further with the respective conduit portions 104, 106 and 108, 110 of the main co-extrusion co-extruder body 38, which are in turn cooperatively connected to the cylindrical bores 60, 62 and 64, 66 of the slotted 48, 50, respectively.

FIGS. 3 and 4 also illustrate the passage of the extruded base layer 112 as it passes through the co-extrusion apparatus. This layer will be discussed in greater detail hereinafter, especially regarding the different layer compositions resulting at different locations along the extruded stream. Also, FIGS. 3 and 4 illustrate one embodiment of the present invention wherein four separate layers of co-extruded polymeric resin are being applied to the base layer, two layers on each side of the base layer. It will readily be understood that this is only exemplary, and any number of layers less than four could be applied to the base layer by simply adjusting the screws of the stream divider. Additionally, it is also within the scope of the present invention that more than 4 individual layers could be applied by simply placing another combination of the co-extrusion apparatus illustrated in FIGS. 3 and 4 in series with the illustrated apparatus.

Figure 5:
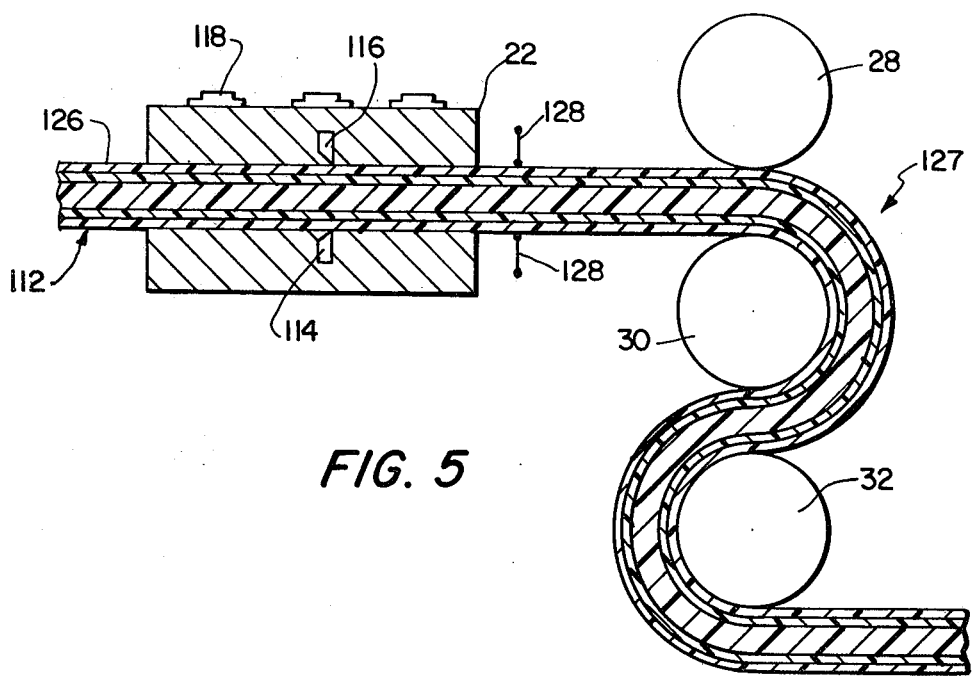
FIG. 5 is a longitudinal, cross-sectional view taken along the line 5—5 of FIG. 2.

FIG. 5 is a cross-sectional view of the extrusion die and rollers taken along line 5—5 of FIG. 2. There is shown the sheeting die 22 having the extruded product 112 passing therethrough. Restrictor bars 114 and 116 can be adjusted depending upon design conditions. Instrument 118, measures product thickness. Finally, as previously discussed, polished cooling rollers 28, 30 and 32 are provided downstream of the die to cool the multiple layered sheeting.

Figure 6:
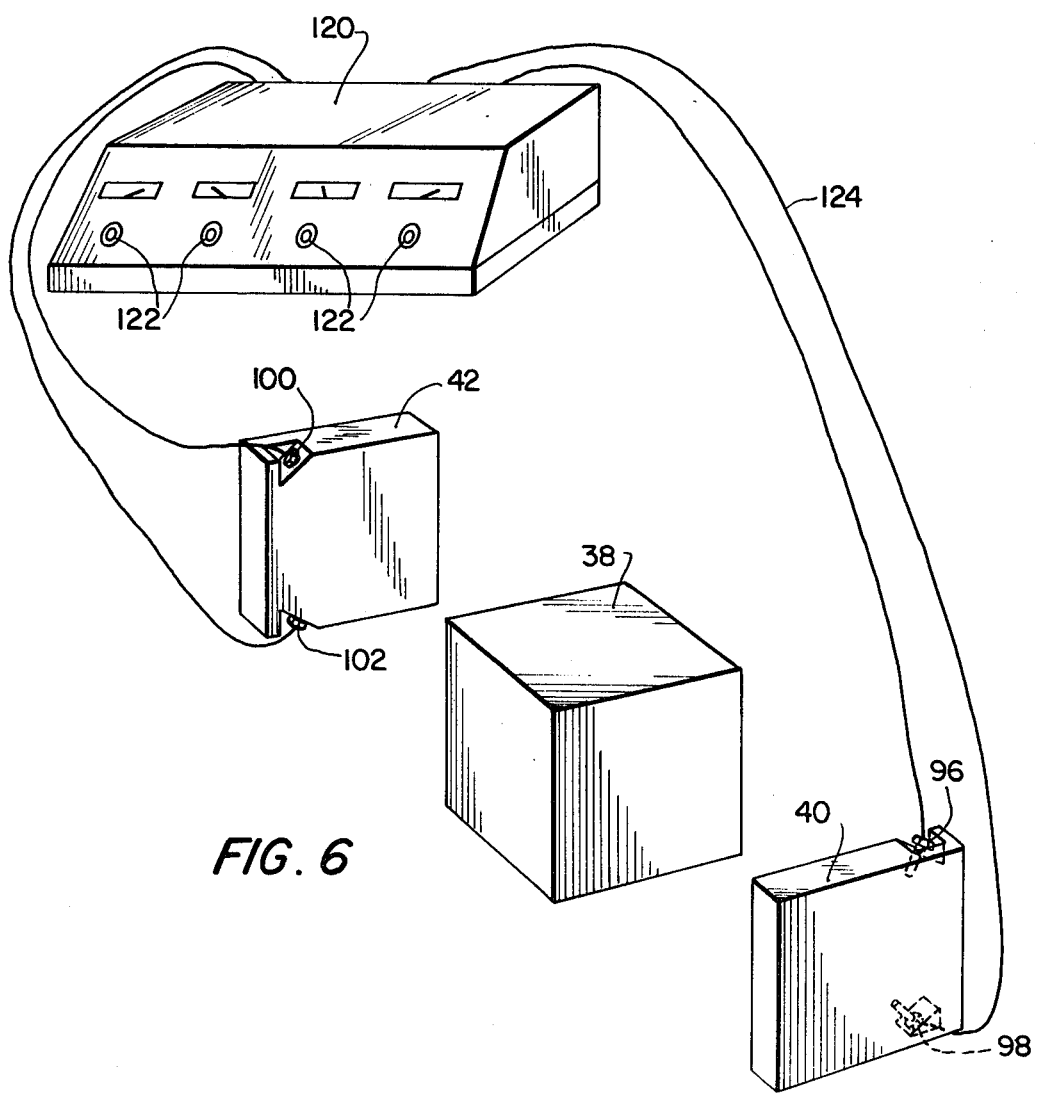
FIG. 6 schematically represents the layer thickness adjusting apparatus of the present invention.

FIG. 6 schematically illustrates the external screw control instrument of the present invention. As shown, the panel board 120 comprises dials 122 for controlling the screw depth by transmitting signals via lines 124 to screw adjustments 96, 98, 100 and 102. Adjustments can be made as a result of measurements taken of the individual layer thicknesses after removal of the multi-layered product from the process, or as a result of measurements taken automatically as an integral part of the co-extrusion process. Such control technology per se is well known.

In the co-extrusion process of the present invention, there is provided by extruder 12 a base layer stream, generally referred to as 112. The composition of the base layer stream varies according to design specifications. As a practical matter, a lower grade, less-expensive polymer is used. Such polymers are usually inferior with regard to certain characteristics, for example, appearance. Examples of appropriate materials for use as a base layer include polystyrene, both the homopolymers and copolymers thereof. Included within this latter category are impact polystyrenes which comprise graft copolymers of styrene upon conjugated diene backbone polymers such as polybutadiene, butadiene-styrene copolymers, butadiene acrylonitrile copolymers, natural rubber, etc. Likewise included in this category are normal copolymers of styrene with other well-known, conventional monomers. This list is by no means limiting.

This base layer stream 112 then passes into the co-extrusion block of FIGS. 3 and 4. Also entering the co-extrusion block are co-extruded resin streams through inlet passages 44 and 46, these co-extruded streams coming from discharge conduits 18 and 36 from co-extruders 16 and 34, respectively.

As previously noted, for the sake of a more complete description, the present invention will be described with reference to the embodiment wherein there are two co-extruded resin streams, and thus, subsequently four layers applied to the base sheeting, two layers to each side.

Specifically referring to FIG. 4, the co-extruded streams entering inlet passages 44 and 46 pass through the main co-extrusion body via conduits 45 and 47. From the main co-extrusion body, these co-extruded streams enter the stream dividers 40 and 42 through initial conduit inlet portions 76 and 78. Each of the single streams is then divided into two further streams passing through conduit paths 80, 82 and 84, 86, respectively. These streams are then returned to the main co-extrusion body 38 via inlets 104, 106, 108 and 110.

The number and extent of streams returning to the main co-extrusion body 38 is determined by screws 96, 98, 100 and 102. By further engaging the screws into the conduit paths, resin flow is reduced, and vice versa. By complete engagement into the path, the entire flow is retarded. Thus the number and extent of the layers applied to the base sheeting is easily controlled.

It is possible by the present invention to control the screw engagement by external means. This is shown by FIG. 6. Illustrated is a layer control instrument 120 comprising a series of dials 122 which by simple manipulation can control the depth to which the screws 96, 98, 100 and 102 engage the conduit paths. This can also be done manually. The signals transferred to the control 120, which indicates overall layer thickness, originate from probes placed at the sheeting die 22 to be described below. The obvious advantage here is that it is not necessary to disassemble the co-extrusion block every time the thickness of the layer or layers needs to be varied.

Upon reentry into the main co-extrusion body 38, the streams pass through further conduit portions 105, 107, 109 and 111. The streams then exit the main co-extrusion body 38 through the conduit portions at outlets 113, 115, 117 and 119 which communicate directly with the bores 60, 62, 64 and 66 of the slotted plates 48, 50. The resin streams pass from these bores through slots 68, 69, 70 and 71 to be layered down upon the base layer stream 112 at orifices 52 and 54.

Thus, there are four individual resin streams applied to the base layer stream for application thereon. The thicknesses of these layers can be varied by the screws as described above. The thickness of each individual layer across its width is controlled as described below.

Referring to FIGS. 4 and 5, a multiple-layered stream 126 having the necessary layer compositions now exits the main co-extrusion body 38 through housing member 51 and progresses to sheeting die 22. At sheeting die 22, final product processing is performed. As the multiple-layered stream enters the sheeting die, it is formed into a sheet.

Further, measurements of layer thicknesses and individual thickness of layers across their widths are performed at the sheeting die, as noted above. In the first case, measurements can be made of layer thicknesses of the multiple-layered product exiting the sheeting die. Any variations necessary can be simply made by manipulation of dials 122 of the control 120 of FIG. 6. These changes will be relayed via wires 124 to the screws of the stream dividers. In the absence of electrical control of screw depth, simple manual manipulation of screw engagement is adequate. The engagement depth of the screws will be automatically adjusted accordingly.

As a second monitoring process, probes 128 are positioned across the width of the sheeting as it exits the sheeting die 22. These probes monitor the thickness of the layer at points across the width of the sheeting. The indications of these measurements provide information as to variations necessary in the depth of slots 68, 69, 70 and 71. Based upon the ratio of slot width in slotted plates 48, 50 to die width, a specific strip of the sheeting product exiting from the die of X inches in width having an unfavorable thickness corresponds to a strip of the slot of Y inches in width. By varying the depth of the slot at the strip of Y inches, a preferred variation of X inches in the product is obtained. Thus, upon discovery of a non-uniformity in layer thickness, it is a simple matter to remove the appropriate slotted plate 48 and 50 and mill out a strip of thickness Y from the appropriate location in slot 68, 69, 70 or 71. Then, the slotted plate is reinserted and the process can continue. This combination of thickness variation instrumentation provides for precise control of layer thickness.

The co-extrusion block 20 as illustrated in FIGS. 3 and 4 comprises one apparatus. The slotted plates 48, 50 are housed in the slotted areas of the housing members 49 and 51, respectively. These housing members are connected to the main co-extrusion body 38 by bolts, not shown, which are provided through the bolt holes 53 of the housing members to engage the threaded bolt receiving areas 55 of the main co-extruder body.

The co-extruded resinous materials of the present invention can be selected from a variety of polymeric material. Polymeric resins within the scope of the invention include PVF (polyvinyl fluoride), ABS (acrylonitrile-butadiene-styrene), PET (polyethylene terephthalate), HIPS (high impact polystyrene), acrylic resins, polyolefins, etc. This list is exemplary and by no means limiting. Any polymeric resins which are customarily extruded are within the scope of the invention.

The following specific example is provided to facilitate a better understanding of the invention, it being understood that the same is intended to be merely illustrative and in no way limitative.

EXAMPLE

A main resin stream of high impact polystyrene (Cosden Oil and Chemical Co. 825D pellets) is extruded from a 4½ inch diameter two stage vented extruder containing a 4:1 compression ratio screw. Two 1¼ inch diameter 24:1 single stage side extruders also having a 4:1 compression ratio screw are arranged as illustrated in FIG. 2 and supply a second adhesive layer of DuPont CXA 1104, and a third stream of PETG (polyethylene terephthalate glycol). The polystyrene is extruded at a temperature of 240° C. and a feed rate of approximately 1000 lbs./hr. The adhesive side stream is discharged from the 1¼ inch extruder at 200° C. and at a feed rate of approximately 15 lbs/hr. The PETG stream is discharged from the 1¼ inch extruder at 250° C. and at a feed rate of approximately 150 lbs./hr.

The first side stream is divided into two streams. The flow of one of the two streams is then completely stopped so that only one layer of adhesive is applied to form an intermediate layer on one side of the polystyrene. The second side stream is also divided into two streams, and likewise, the flow of one of these two streams is completely stopped so that only one layer of PETG is applied, the PETG layer being applied to the adhesive layer previously formed. There results a single stratified stream having junction interfaces between the three separate layers. The combined stream is conducted to an extrusion die orifice 52 inches wide with lips set at approximately 80 mils. The die temperature averages about 230° C.

Upon leaving the die lips, the extruded sheet passes a series of three 12-inch polished chrome cooling rolls, the top roll maintained at 40° C., middle roll at 95° C. and bottom roll at 65° C. Roll pressures at top and bottom are maintained at 23 psi and 18 psi, respectively, and at a gap setting of 80 mils.

Such a three layered product, as well as the configuration of resin streams for producing same, are graphically illustrated in FIG. 3 of the drawings. A base layer stream 112 exits from main extruder 12, at slotted plate 48 one intermediate layer 123 is applied to one side of base layer stream 112, and at slotted plate 50 one surface layer 125 is applied to the one intermediate layer 123. Upon exiting from die 22, a three layered sheet 127 is produced.

Examination of the final sheeting product evidences essentially uniform layers of the PETG, adhesive and impact polystyrene. The thickness of the layers of the impact polystyrene is 100 mils. The thickness of the adhesive layer is approximately 1 mil, and the thickness of the PETG is 10 mils. The individual layers are of uniform thickness across the entire width.

Thus, there has been provided according to the invention to process for co-extruding multi-layered sheeting having uniform layer thicknesses.

While the fundamental novel features and advantages of the invention have been pointed out in connection with a few illustrated embodiments thereof, it will be appreciated that various obvious modifications of the co-extrusion process and apparatus will suggest themselves to one or ordinary skill in the art. Therefore, it is intended to be limited only by the scope of the following claims.

What is claimed is:

1. A co-extrusion apparatus for the production of multi-layered products of thermoplastic synthetic resins having selected numbers of layers, comprising:

a main extruder for producing a main heat-plasticized resin stream;

at least one co-extruder for producing a side heat plastified resin stream;

a co-extrusion feedblock positioned downstream of said extruder and said co-extruder for receiving said main resin stream and said side resin stream and for producing a combined resin stream, said co-extrusion block comprising at least one slotted plate having a central orifice which provides for the passage of said main resin stream and slotted portions on either side of said central orifice for laying down layers of said side resin stream upon said main resin stream, conduit means within said co-extrusion block for splitting said side resin stream and supplying sub-streams thereof to said slotted portions, and adjustment means for varying the volume of flow to any level necessary in each of said sub-streams, said adjustment means being internal to said co-extrusion block and comprising means for external adjustment thereof; and a sheeting die downstream of said co-extrusion block for receiving said combined stream and for forming the multi-layered product into a multi-layered sheet.

2. A co-extrusion apparatus as claimed in claim 1, wherein said co-extrusion feedblock further comprises:

a main co-extrusion body positioned between said main extruder and said sheeting die, said body comprising a central orifice aligned with said central orifice of said slotted plate providing for the passage of said base layer therethrough.

3. A co-extrusion apparatus as claimed in claim 2, wherein each of said slotted portions comprises a circular bore area extending partially through the thickness of said slotted plate, said bores being positioned opposite each other in regard to said central orifice, and a slot connecting each of said bores to said orifice, the depth of said slots being less than the thickness of said slotted plate.

4. A co-extrusion apparatus as claimed in claim 3, wherein said stream splitting means divides said co-extruded stream into two streams and returns said divided co-extruded streams to said bores of said slotted plate.

5. A co-extrusion apparatus as claimed in claim 1, wherein said flow-varying means comprise screws.

6. A co-extrusion apparatus as claimed in claim 1, wherein said flow-varying means is capable of completely retarding the flow of said side resin stream through one of said sub-streams.

7. A co-extrusion apparatus as claimed in claim 1, comprising two of said slotted plates positioned at opposite sides of said main co-extrusion body in the direction of travel of said base layer, and whereas said co-extrusion block further comprises a second conduit means and a second adjustment means for said second slotted plate.

8. A co-extrusion apparatus as claimed in claim 1, wherein the depth of said slots of each said slotted plate in machine-varied across the width of said slots by an amount sufficient to provide a layer of uniform thickness.

9. A co-extrusion apparatus as claimed in claim 7, further comprising a second co-extruder connected upstream of said feedblock for supplying a second side stream of heat-plastified resin to said second slotted plate.

10. A co-extrusion apparatus as claimed in claim 1, wherein said slotted plate comprises a readily removable and interchangeable element.

11. A process for producing a multi-layered sheeting, comprising the steps of:
  extruding a base layer stream of a heat-plastified material;
  co-extruding at least one side stream of a heat-plastified material;
  passing said base layer stream through a co-extrusion feedblock;
  passing each said side stream into said feedblock;
  splitting each said side stream in said feedblock into a plurality of sub-streams;
  selectively controlling the flow rate of said sub-streams within said feedblock by external adjustment thereof;
  selectively passing at least one of said sub-streams to a selected plate member attached to said feedblock, said plate member having a slot for each sub-stream communicating with said base layer stream passing through said plate member;
  laying down at least one layer of said sub-stream upon said base layer stream at said plate member to produce a multi-layered stream; and
  passing said multi-layered stream through an extrusion die to form the multilayered sheeting.

12. A process as claimed in claim 11, further comprising the step of controlling the uniformity in thickness of each co-extruded layer by varying the depth of said slots.

13. A process as claimed in claim 12, wherein the depth of said slot can be varied to different depths across the width thereof.

14. A process as claimed in claim 11, wherein said co-extrusion side stream material is applied to both surfaces of said base layer stream.

15. A process as claimed in claim 11, wherein said co-extruded side stream material is applied to only one surface of said base layer stream.

16. A process as claimed in claim 11, wherein the co-extruding step comprises co-extruding a second side stream.

17. A co-extrusion apparatus for the production of multi-layered products of thermoplastic synthetic resins having selected numbers of layers, comprising:
  a main extruder for producing a main heat-plasticized resin stream;
  at least one co-extruder for producing a side heat-plastified resin stream;
  a co-extrusion feedblock positioned downstream of said extruder and said co-extruder and, comprising:
    a main co-extrusion body having a central orifice providing for the passage therethrough of a base layer of said main resin stream and at least two conduit means for receiving and transporting said side resin stream through said feedblock;
    at least two side blocks positioned on either side of said main body along the longitudinal axis of said main resin flow, each of said side blocks comprising a conduit means which operatively engage one of said conduit means of said main co-extrusion body, for receiving and dividing said side resin stream into two substreams and for returning said substreams to said main co-extrusion body, and adjustment means engaging each of said substreams for internally varying the flow of said substreams by external adjustment thereof;
    at least two slotted plates positioned on either side of said main co-extrusion body transverse to the direction of flow of said main resin stream, each of said plates having a central orifice aligned with the central orifice of said main co-extrusion body and slotted portions on either side of said central orifice for laying down layers of said side resin stream upon said main resin stream, each of said slotted portions comprising a circular bore area extending partially through the thickness of said slotted plate and positioned opposite each other in regard to said central orifice and having a slot connecting each of said bores to said orifice, wherein each of said bore areas operatively engage said conduit means of said main co-extrusion body to provide for the passage of said substreams from said main co-extrusion body into said bore areas and along said slots to be applied to said main resin stream to form a combined stream; and
  a sheeting die downstream of said co-extrusion block for receiving said combined stream and for forming the multi-layered product into a multi-layered sheet.

* * * * *